3,551,054
INTERFEROMETERS

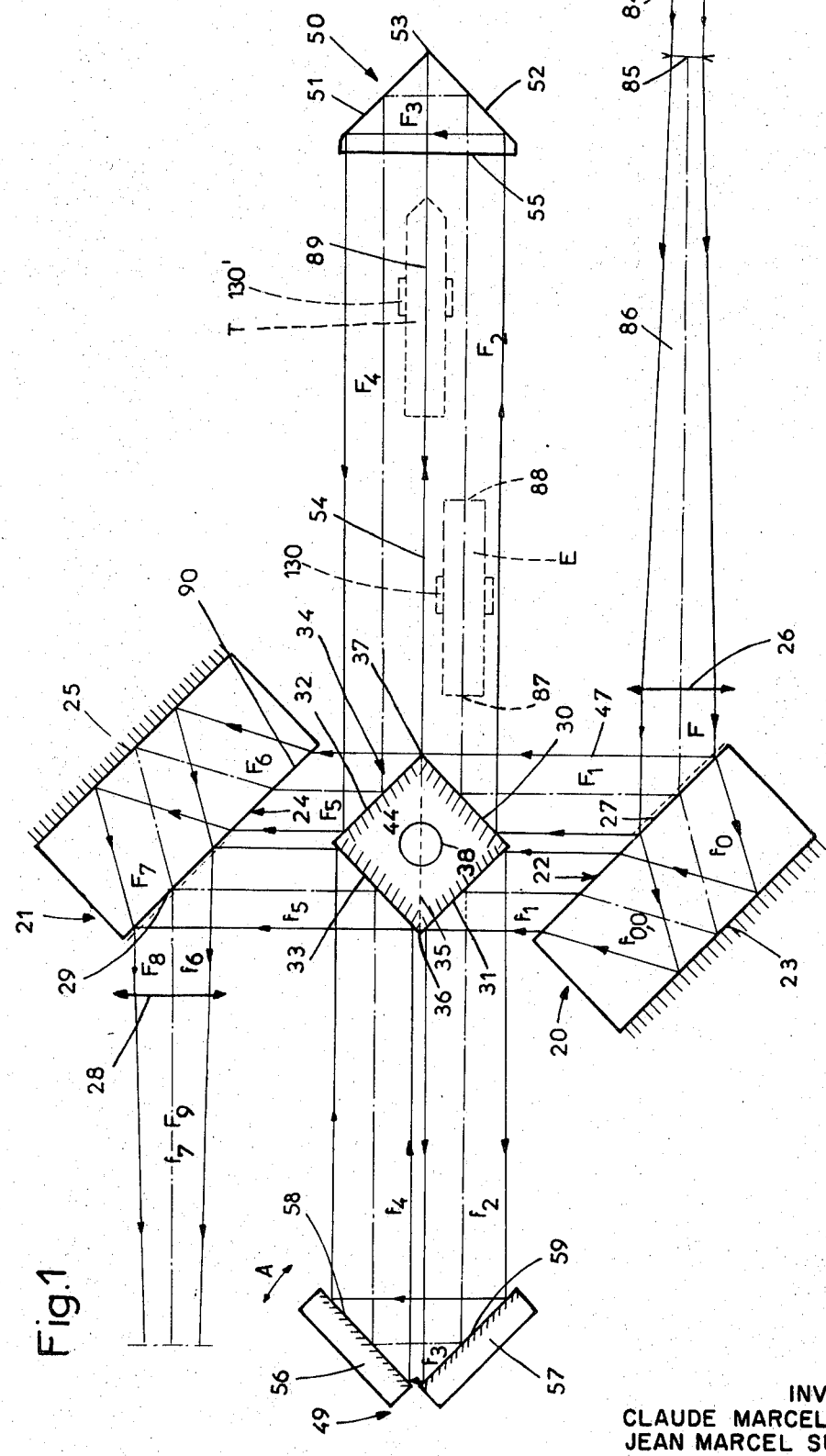

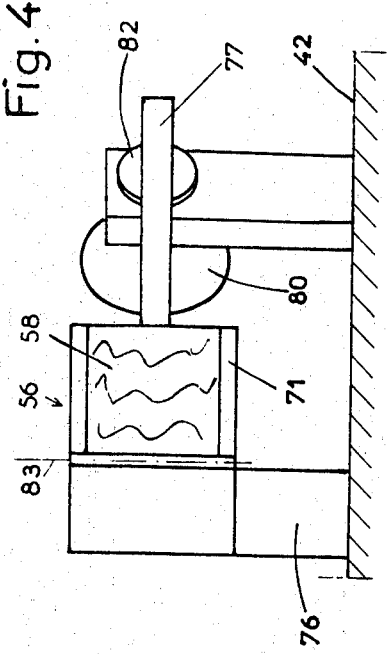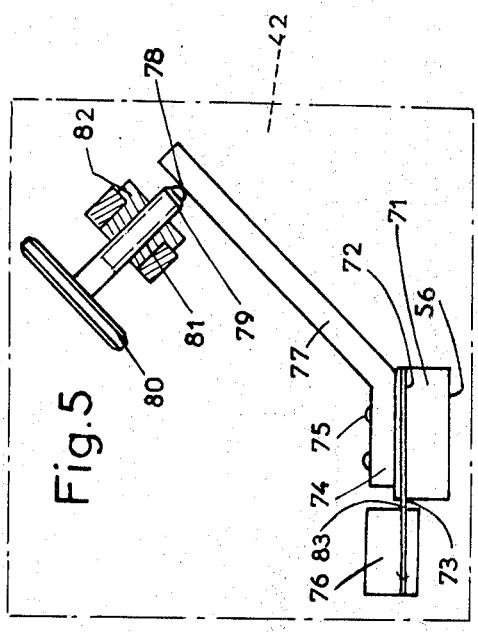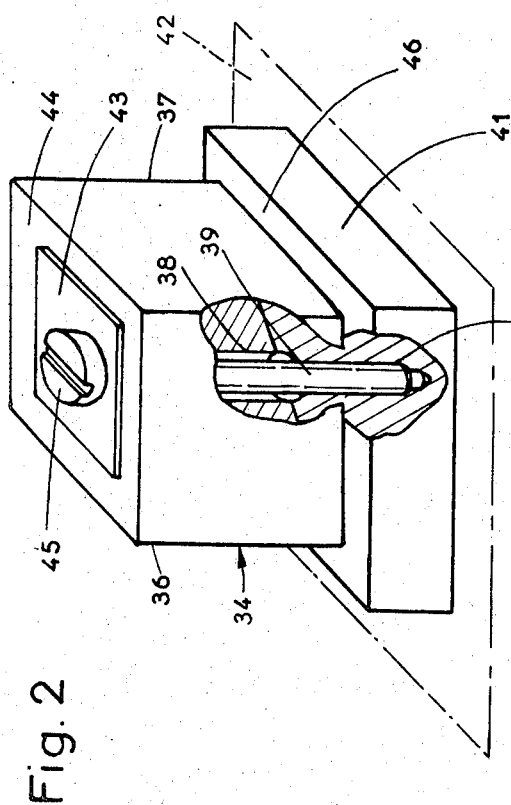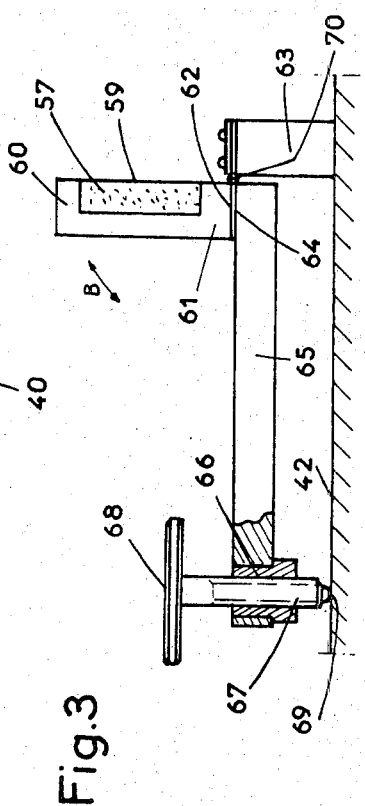

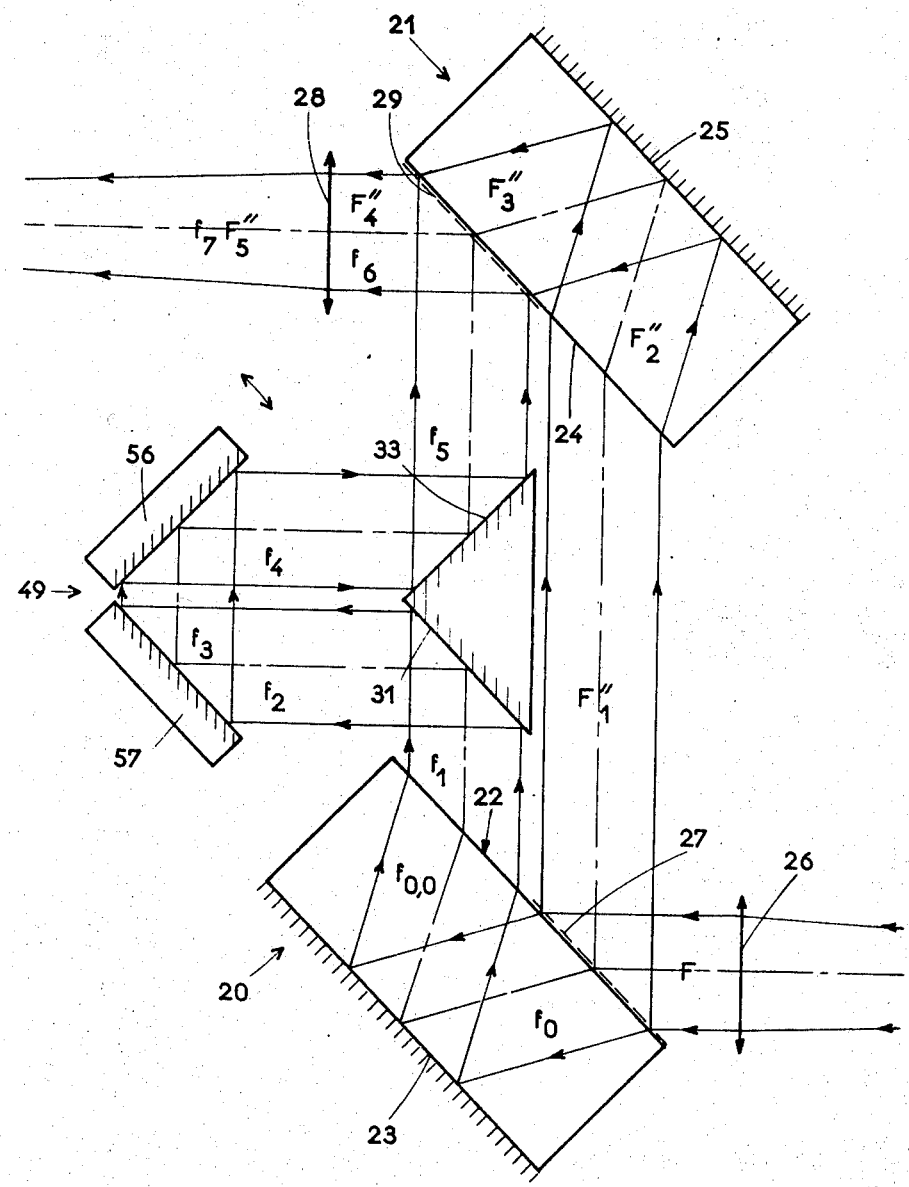

Claude Marcel Véret, Saint-Maur, and Jean Marcel Surget, Joinville-le-Pont, France, assignors to Office National d'Etudes et de Recherches Aerospatiales, Chatillon-sous-Bagneux, France
Filed Apr. 18, 1967, Ser. No. 631,648
Claims priority, application France, Apr. 21, 1966, 58,421
Int. Cl. G01b 9/02
U.S. Cl. 356—106         11 Claims

ABSTRACT OF THE DISCLOSURE

An interferometer for the testing of radiation-transparent articles has a solid body with at least on pair of orthogonally adjoining reflecting surfaces from which a bundle of light rays received from an input beam splitter are directed onto and received back from two orthogonally adjoining mirrors respectively confronting these surfaces in parallel relationship therewith. The rays of this bundle are then combined with those of a second bundle, also generated by the input beam splitter, in an output beam splitter to provide a coincidence pattern indicative of the optical characteristics of a test object placed in one of the ray paths; the path of the second ray bundle may include a second pair of reflecting surfaces on the solid body. The two mirrors may be limitedly and independently swingable about different axes to vary the pattern. Alternatively, the test object may be positioned with its plane of symmetry bisecting the angles included by these mirrors and by the confronting reflecting surfaces whereby the same light rays traverse respective halves of the object in opposite directions.

---

The present invention relates to interferometers.

Interferometers are optical devices mainly used for high-precision measurements. They are used in various fields, for instance to obtain data concerning a transparent medium (gaseous, liquid or solid) and also for checking dioptric surfaces, measuring thicknesses, etc.

The most common interferometers belong to a few types, the better known of which are the Michelson, the Mach-Zehnder and the Jamin varieties.

Michelson and Mach-Zehnder interferometers are generally used in laboratories. Although they do give numerous and accurate informations, they are relatively delicate to handle, which entails operation by a specialist.

Jamin interferometers are of simpler design but, up to now, are not much in use except for didactic purposes. Until now, it has not been possible, with such interferometers, to vary at will the number and/or the fringe disposition which indicate interferences, thus frustrating attempts to determine the various causes of the interferences observed and if only more to obtain a quantitative result, even approximately.

It is an object of the invention to provide an improved interferometer, particularly one of the Jamin type, which is of considerably increased versatility when in use.

A more particular object of the invention is to provide an interferometer, using Jamin's basic construction, which allows a fringe setting and by means of which it is possible to distinguish in a transparent element examined with the aid of said interferometer—the word "element" being understood in its broadest sense, not necessarily limited to solid state—the defects due to the non-homogeneity of its constituent medium, from those inherent in the surface bounding the element.

It is also an object of the invention to provide such an improved interferometer which is of small size and whose mechanical components can be readily manufactured.

It is a further object of the invention to provide such an interferometer the handling of which is sufficiently simple so that it can be used by non-specialists.

In this connection, it is an object of the invention to provide an interferometer whose setting is virtually unaffected by rough handling, thus avoiding the need for calling in an optical specialist.

It is also an object of the invention to provide an interferometer which can be used without necessarily requiring the same precautions as in a laboratory, and which can therefore be placed in a workshop, notwithstanding the disturbance factors which might prevail in the latter.

The interferometer according to the invention is particularly well adapted for the checking, during fabrication, of small-diameter optical parts, such as laser cylinders. It is known that these cylinders (made of synthetic rubies or neodynium glass, etc.) necessitate, for good operation, not only a high precision of manufacture but also an almost perfect homogeneity of the material they are made of. In this respect, an interferometer according to the invention permits the checking of the quality of the material of a part designed for the manufacture of such cylinders, or resonators, thus allowing the scrapping of unsuitable articles before complete manufacture thereof.

The device according to our invention can be used for checking cylinders comprising plane and parallel end faces as well as cylinders having one end in the shape of a dihedron or "gable."

The improvements according to the invention can be applied to interferometers of a type different from that of Jamin and in particular to the interferometers of the Mach-Zehnder type.

In the following description, given by way of example, reference is to be made to the appended drawing, wherein:

FIG. 1 is a plan view of the general layout of a Jamin interferometer, improved according to the invention;

FIG. 2 is a perspective, schematic view of a component of the apparatus, with parts broken away;

FIG. 3 is a schematic elevational view of another device forming part of the apparatus;

FIG. 4 is a view of another device forming part of the apparatus;

FIG. 5 is a plan view of the assembly shown in FIG. 4;

FIG. 7 is a view similar to that of FIG. 1, but for a simplified embodiment.

Figure 6:
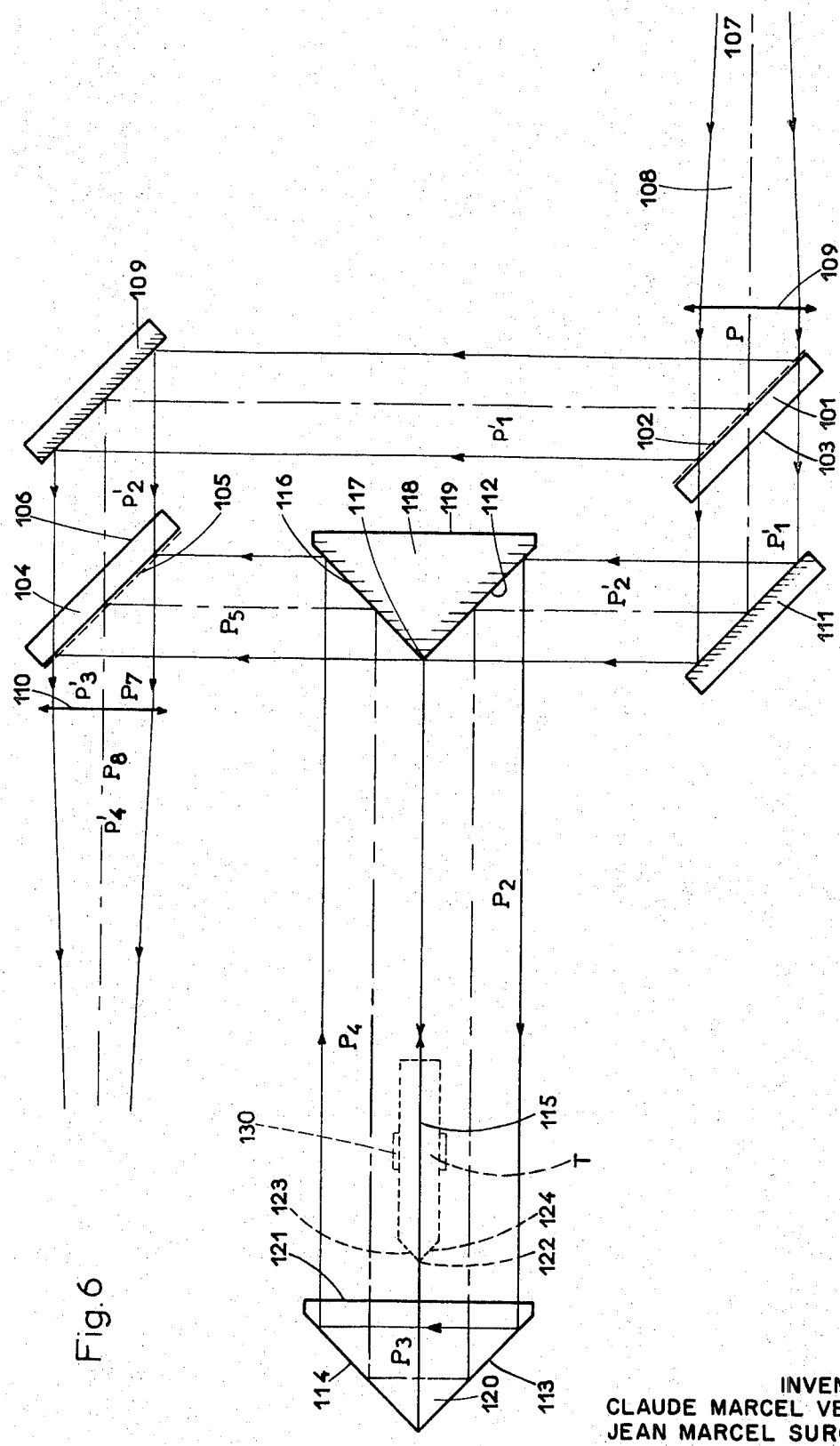
FIG. 6 is a general view of a Mach-Zehnder interferometer improved according to the invention.

The improvement according to the invention is applied, in the embodiment described by way of reference to FIG. 1, to an interferometer of the Jamin type comprising two beam-splitting plates 20 and 21 with parallel faces. The entry face 22 of plate 20 is semireflecting on one half 27, the other half thereof being nonreflective; its opposite aluminized reflecting face 23 is strictly parallel to face 22. Face 24 of plate 21 confronting face 22, is also semireflecting on one portion 29 and the opposite aluminized face 25 is strictly parallel to face 24. A conventional objective, indicated symbolically at 26, is located ahead of plate 20, so as to direct onto an entrance zone 27 of face 22 a flux F of parallel rays. Another lens 28 is located downstream of face 24, to receive a flux of parallel rays from an exit zone 29 of said face. Lens 28 re-forms the image of the investigated field on an observation screen, a photographic emulsion, a photosensitive cell, or the target of a television camera or any other photo-sensitive receiver.

During their manufacture, the blocks constituting the plates 20 and 21 are positioned in such a way that their faces 22–23 and 24–25 are in parallel relationship, although this parallelism of the faces of one plate relative to those of the other plate does not have to be strictly maintained.

According to the invention, there are placed between plates 20 and 21 four flat reflecting faces oriented at right angles to one another. Preferably, the four reflecting surfaces are the faces 30, 31, 32 and 33 of a cube 34 made, for instance, of silicon dioxide. Cube 34 is positioned in such a manner that one of its diagonal planes, i.e. the plane 35, bisecting the junctions 36 of faces 31 and 33 and 37 of faces 30 and 32, is perpendicular to the direction of the rays of beam $F_1$ reflected by portion 27 of plate 20.

For the positioning purposes, cube 34 is provided with a central hole 38 (FIG. 2) parallel to edges of 36 and 37; through this hole passes a threaded rod 39 whose diameter is smaller than that of hole 38 and which is provided with a head 45, at the top, its lower end engaging in a threaded hole 40 of a base plate 41, fixed on a table 42. A small plate 43 is placed between the flat upper horizontal face 44 of the cube and the head 45 of rod 39.

The proper orientation of the cube in the various directions is carried out simply by a displacement thereof on the upper face 46 of base plate 41, the cube being then locked in the desired position by tightening the screw 39. By this procedure, cube 34 is positioned so that its edge 37, which forms the intersection of faces 30 and 32 and should be manufactured with the highest degree of acuteness, lies in a forward vertical plane 47 bounding the bundle $F_1$ of rays reflected at surface 27. The face 31 of cube 34 is large enough to receive a second ray bundle $f_1$ from plate 20, this bundle resulting from refraction of the beam F at surface 27 (ray path $f_0$) followed by internal reflection (ray path $f_{0,0}$) on the face 23 of plate 20 and further refraction at face 22.

The cube 34 is flanked by a pair of angular reflectors 49 and 50. The mirrors of device 50 are constituted as a total-reflection prism whose reflecting faces 51 and 52 intersect along an edge 53 parallel to edges 36 and 37 of cube 34; edge 53 is located in a plane 54, forming one boundary of a ray bundle $F_2$, derived from beam $F_1$ by reflection on face 30 of cube 34. The hypotenuse face 55 of reflector 50 forms an angle of substantially 45° with face 30 of the cube.

The two reflecting faces of device 50, instead of being the faces of a prism, could also be two permanently fixed mirrors positioned at right angles to each other.

Device 49 is constituted by two mirrors 56 and 57 whose operative faces 58 and 59 are disposed in a substantially symmetrical position in relation to plane 35 and form between each other an angle of substantially 90°.

Also according to the invention, means are provided for angularly varying the positions of mirrors 56 and 57.

In the described embodiment, mirror 57 (FIG. 3) is held in a frame 60 of U-shaped vertical section, which is fixed by its lower branch 61, to a resilient blade 62, the latter being secured at its other end to a post 63. Blade 62 is fixed, by its lower face 64, to one end of an arm 65 whose other end has a threaded hole 66 engaged by a threaded rod 67 ending in a knob 68. The tip 69 of the threaded rod 67 bears on a fixed member, which can be the table 42 of FIG. 2. By turning knob 68, mirror 57 can thus be swung about an axis 70, perpendicular to the plane of the figure, between the portion of blade 62 to which frame 60 is fixed and the blade portion fastened in post 63, such a displacement being diagrammatically illustrated by the double arrow in FIG. 3. Rotation of the knob is limited to one turn by automatic means cooperating either with knob 68 or with rod 67.

The other mirror 56 (FIGS. 4 and 5) is also held in a generally U-shaped frame 71 fixed by its bottom portion 72 to the outer portion of a blade 73, the connection being effected by a clamping piece 74 carrying screws 75. The inner portion of blade 73 is gripped in a post 76. Clamping piece 74 is part of an arm 77 which abuts the tip 78 of a screw 79 provided with a head or knob and cooperating with threads 81 of a nut 82 integral with table 42. One can thus, by turning knob 80, swing the mirror 56 in one sense or the other, around a vertical axis 83 lying substantialy in the portion of blade 73 between frame 74 and post 76, this movement being diagrammatically shown by the double arrow in FIG. 1. Rotation of knob 80 is limited to one turn by abutment means cooperating either with knob 80 or with screw 79.

The mechanical members, just described, for varying the orientation of mirrors 56 and 57 can be readily produced by simple machining. The threads of screws 67 and 79 must just be of good quality but require no particular finish. The resilient blades 62 and 63 take up any play in screws 67 and 79.

As indicated by arrow A in FIG. 1, the swing of mirror 56 occurs about an axis (83, FIG. 4) which is parallel to the vertical plane 54 bisecting both the angle included between cube faces 31, 33 and the angle included between mirror surfaces 58 and 59. Conversely, as indicated by arrow B in FIG. 3, mirror 57 swings about a horizontal axis 70 which lies in the swing plane of its companion mirror 56.

The operation is as follows:

A high-power dispersive lens 85 converts an incident ray bundle 84 into a bundle 86 which falls upon the lens 26. The latter generates the bundle F of parallel rays. The part of radiant flux of bundle F which penetrates the surface 27 of plate 20 propagating along paths $f_0$ and $f_{0,0}$ leaves plate 20 as the bundle $f_1$ which is reflected by face 31 of cube 34 as a bundle $f_2$. This bundle $f_2$ is reflected by mirror 57 along a path $f_3$ and thereafter by mirror 56 along a path $f_4$, being then further reflected by face 33 of cube 34 as a bundle $f_5$. This latter ray bundle is reflected by face 24 of plate 21, as a bundle $f_6$ from which lens 28 generates an outgoing bundle $f_7$. The ray bundles $f_1$–$f_7$ may be considered successive sections of a reference beam.

The other half of bundle F, i.e. the one which is reflected by portion 27 of plate 20, constitutes the beam $F_1$ which is reflected by face 30 of cube 34, as the bundle $F_2$ which enters prism 50 by the hypotenuse face 55 of the latter. The prism is arranged, advantageously, in such a manner that face 55 is not strictly perpendicular to the direction of bundle $F_2$, which avoids the disturbances resulting from the parasitic reflection of light on a surface perpendicular to its direction of propagation; such interference is particularly noticeable when the light is coherent. Bundle $F_2$ reflects itself on face 52 of prism 50 as a bundle $F_3$ which is, in turn, reflected by face 51 of prism 50 as a bundle $F_4$ whose inner boundary 89 coincides with the inner boundary 54 of bundle $F_2$. Bundle $F_4$ is reflected by face 32 of cube 34, as a bundle $F_5$ which enters, through face 24, the plate 21 as a refracted bundle $F_6$, the portion of bundle $F_5$ reflected by the entry zone 90 of said face being left unused. Bundle $F_6$ entering plate 21 is reflected by the reflecting face 25 of said plate 21 along a path $F_7$ and leaves plate 21, after refraction at zone 29 thereof, as a bundle $F_8$ which coincides with bundle $f_6$ and which, after passing through lens 28, becomes an outgoing bundle $F_9$ coinciding with ray bundle $f_7$. Observation of the registering bundles $F_9$ and $f_7$ delivered by lens 28 provides the desired interferometric information. The ray bundles $F_1$–$F_9$ may be considered successive sections of a measuring beam.

For pre-setting, the heads or knobs 80 and 68 are brought in their mean position, that is, the position from which each can be rotated through approximately equal angles, in one sense or the other, before coming to a stop.

From a setting of the interferometer for which one observes a flat tint in the observation plane, rotation of knob 68 causes a changeover to a pattern of more or less closely spaced horizontal fringes. Rotation of mirror 57 modifies the angle between the centerlines of bundles $F_9$ and $f_7$, the centerline of reference bundle $f_7$ then sweeping a vertical plane.

The operation of knob 80 results in a changeover from the flat tint to a pattern of more or less closely spaced vertical fringes, the pivoting of mirror 56 entailing a sweep in a horizontal plane for the centerline of the reference bundle $f_7$.

Simultaneous operation of both knobs 68 and 80 produces slanted fringes.

The variation of the relative inclination of the reference bundle and the measure bundle thus results in the appearance of localized fringes, such as obtained with a Michelson or Mach-Zehnder interferometer, the obtention of such fringes not having been possible up to now with a Jamin-type interferometer.

The improved interferometer can be used with white or monochromatic light, as supplied by a standard source of radiation. In this case, compensating plates and/or mechanical devices are provided for equalizing the paths of the measuring and reference beams. To this end, for instance, device 49 can be slidably mounted for movement away from or toward cube 34. The source is then located at the focus of lens 26 and the divergent lens 85 is removed. A supporting member for a color filter is advantageously juxtaposed to lens 26.

Application of the interferometer according to the invention for checking or testing, during manufacture, cylinders designed to act as resonance cavities in lasers will now be described. For this checking operation a coherent, monochromatic light is advantageously used, such as the light supplied by a gas laser with continuous emission. With such a light, the distance between cube 34 and device 49 does not necessarily have to be equal to the distance between said cube and device 50. The bundle 84 supplied by a gas laser is a small-diameter cylindrical beam. An entry diaphragm placed against lens 26 gives to bundle F the necessary rectangular cross-section for this particular application.

The article E to be checked, i.e. a radiation-transparent object, is placed in bundle $F_2$ reflected by face 30 of cube 34 towards prism 50. This article is supported by any appropriate means, such as, for instance, a cradle 130 of V-shaped profile. The article E is, for example, a transparent cylinder with two end faces 87 and 88 placed transversely to the beam.

The introduction of the article to be examined into the measuring bundle $F_2$ effects modifications in the light paths of the rays passing through the article, with appearance of corresponding fringes in the observation plane.

The observed fringes can be rectilinear or assume shapes which are more or less sinuous. The rectilinear fringes generally indicate that the article E is made of homogeneous material, but that faces 87 and 88 are not in parallel relationship. One can then, simply by modifying the orientation of the article about its axis, bring the observed fringes to a specific orientation, for instance vertical.

If, initially, knobs 68 and 80 have been turned so that the observation background is a flat tint, one can, by rotating said knobs, make horizontal, vertical or slanted fringes appear on the background and by comparison of the background fringes with the corresponding fringes of the article, ascertain and/or measure the relative slant of faces 87 and 86.

The presence of sinuous fringes which occur in the observation field corresponding to the article, and which cannot be suppressed by rotating the knobs, is the sign that the material constituting article E is heterogeneous.

The interferometer according to the invention thus permits the checking, in one single operation, of the parallelism of the end faces and the homogeneity of the material constituting the checked article.

The invention is particularly useful for checking a batch of transparent cylinders which are to be used as resonators. The front faces of the cylinders are then polished according to methods generally used in optics, their flatness being checked by means of a gauge as for any other optical element. Each cylinder is then tested by the interferometer according to the invention. Being able to distinguish between angle defects and index irregularities, the user retains only those specimens which do not exhibit objectionable index irregularities; the article is then sent to the manufacturing department for transformation into a resonant cavity. As the case may be, the end faces are made parallel or beveled. If, however excessive index irregularities are revealed during checking with the help of the interferometer according to the invention, the article is scrapped, thus avoiding unnecessary expenses in the manufacture of a resonator which on final analysis would prove to be worthless.

The apparatus according to the invention may also be used for checking articles having a gabled end with two perpendicular slopes, as often used in practice, such an article being indicated at T in FIG. 1 (see also FIG. 6 described below). The article is then positioned so that its plane of symmetry merges with the common boundary plane 54–89 of bundles $F_2$ and $F_4$, the adjustment which makes these planes coincide being particularly useful for this application. The article is supported by any appropriate means such as, for instance, a V-shaped member 130'. The article to be checked is first traversed in its lower half as viewed (in FIG. 1) by bundle $F_2$, then in its upper half by bundle $F_4$, the observation of the interferograms which may be obtained by bundles $F_9$ and $f_7$ providing information concerning the homogeneity or non-homogeneity of the material from which article T is made.

In the interferometer according to the invention, no glass surface is normal to the ray path which eliminates any risk of parasitic reflections, enabling its use with a very coherent radiation, such as supplied by a laser, without entailing the formation of undesirable fringe problems.

The glass surfaces which must be strictly positioned in relation to one another are, in the interferometer according to the invention, part of the same optical element. This is true of the faces in each of the plates 20 and 21, of the faces of cube 34 and of the faces of prism 50. Accurate setting is thus ensured by the geometric shape produced by optical grinding, a technique for which a much higher degree of precision can be realized than with mechanical machining.

The invention also contemplates improvements in the Mach-Zehnder type of interferometer, so that it may be used for checking elements or articles through which light must pass back and forth, such as an article with a gabled end. Such as improved Mach-Zehnder interferometer embodying our invention is schematically illustrated in FIG. 6 which, it will be noted, is structurally identical with the right-hand position of FIG. 1.

A parallelepipedic beam-splitting plate 101 has a semi-reflecting face 102 and a parallel face 103 through which light passes freely. A companion plate 104 has a semi-reflecting face 105 and a parallel face 106 through which light passes freely. An incident beam 108, advantageously of coherent light, is supplied from a source 107; a lens 109, juxtaposed with a rectangular entry diaphragm not shown, defocuses this beam into a bundle of parallel rays P. The part of bundle P which is reflected by face 102 constitutes a bundle $p'_1$ which is directed along a path $p'_2$ by a mirror 109 towards plate 104 into which it penetrates through face 106 and which it leaves through face 105 as a bundle $p'_3$ focused by a lens 110 into a convergent bundle $p'_4$; the bundles P, $p'_1$, $p'_2$, $p'_3$, $p'_4$ constitute sections of 2 reference beams. The portion of bundle P which penetrates into plate 101 through the semi-reflecting face 102 passes through said plate and leaves it through face 103 to form a bundle $P'_1$. The latter is reflected by a mirror 112 according to a path $P'_2$ and impinges on a reflecting face 111 which trains bundle $P_2$ upon a face 113 parallel to mirror 112 whereas, after a second reflection on a mirror 114 perpendicular to face 113, a bundle $P_4$ emerges which has a common boundary plane 115 with bundle $P_2$. Bundle $P_4$ is reflected by a face 116 perpendicular to face 112 and intersecting the latter along an edge 117 located in plane 115.

Advantageously, faces 112 and 116 are part of a single element, for instance a half-cube 118, whose substantially diagonal front face 119 is not operational.

The two mirrors 113 and 114 are shown to be two mutually perpendicular internal surfaces of a total reflection prism 120 whose hypotenuse face 121 is substantially parallel to an internal bundle $P_3$, derived from bundle $P_2$ by its reflection on face 113. It is preferred that face 121 be not strictly perpendicular to the rays of bundle $P_2$.

A bundle $P_5$, resulting from the reflection of bundle $P_4$ on face 116, is reflected by the semi-reflecting face 105 of plate 104 as a bundle $P_7$ spatially merging with bundle $p'_3$, a lens 110 deriving from bundle $P_7$, a bundle $P_8$ spatially merging with bundle $p'_4$. The ray bundles $p'_1$, $p'_2$, $p_2$–$p_8$ are sections of a measuring beam in which the article to be tested or checked is placed.

This Mach-Zehnder type of interferometer, but improved according to the invention, enables particularly the checking of gable-ended articles, as indicated at T, the article being placed in such a way that the ridge line 122 of the gable, whose sides 123 and 124 are perpendicular, is positioned in plane 115, the article being symmetrically disposed relative to said plane. The observation screen is placed in the ray path $p'_4$–$P_8$, beyond lens 110. The adjustment of the fringes visible on the screen may be made through the conventional means of the Mach-Zehnder interferometer.

Whereas FIG. 6 shows the improvements according to the invention applied to a Mach-Zehnder type of interferometer, permitting the study of articles through which light passes in two directions, FIG. 7 relates to a Jamin-type mirror-equipped interferometer embodying the improvements according to the invention, to permit the fringe adjustment.

In the interferometer according to FIG. 7, the measuring path comprises a bundle $F''_1$, in which is placed the article to be examined or checked, and which results from the reflection of incident bundle F on the semi-reflecting portion 27 of face 22 of plate 20 (cf. FIG. 1). Bundle $F''_1$ penetrates into plate 21 as a bundle $F''_2$, which is reflected by face 25 as a bundle $F''_3$ and leaves plate 21 as a bundle $F''_4$ from which lens 28 derives a bundle $F''_5$. The reference path is similar to that of the embodiment according to FIG. 1: bundle F penetrates into plate 20 through face 22 of the latter as a bundle $f_0$, which is reflected at face 23 as a bundle $f_{0,0}$ which leaves plate 20 through face 22, emerging as a bundle $f_1$. The latter is reflected by face 31 as a bundle $f_2$ toward mirror 57, which is part of device 49. Bundle $f_3$, leaving that mirror, is reflected by mirror 56, which is also part of device 49 as a bundle $f_4$ which is reflected by face 33 as a bundle $f_5$ and by semi-reflecting face 29 of plate 21 as a bundle $f_6$ spatially merging with bundle $F''_4$; the interference fringes appear on a screen positioned in the common path of bundles $f_7$ and $F''_5$, the latter resulting from bundle $F''_4$ when passing through lens 28.

Such an improved Jamin interferometer allows a fringe setting through actuation of members such as knobs 68 and 80, FIGS. 3 and 5 to vary the orientation of mirror 57 about an axis parallel to the plane of FIG. 7 and to its reflecting face and to vary the orientation of mirror 56 about an axis perpendicular to the plane of the figure and parallel to its reflecting face.

What is claimed is:

1. An interferometer comprising first beam-splitting means positioned to intercept a bundle of incident rays and to direct said rays partly along a first path and partly along a second path; reflecting means in said first path including a pair of relatively inclined mirrors positioned at an angle of substantially 90° to each other; first adjusting means for limitedly swinging one of said mirrors about an axis parallel to a plane bisecting the angle included by said mirrors; second adjusting means for limitedly swinging the other of said mirrors about an axis in the plane of swing of said one of said mirrors; second beam-splitting means positioned to receive the rays reflected by said mirrors and the rays passing along said second path for combining same into two substantially coincident outgoing bundles; and supporting means for an object to be tested in one of said paths.

2. An interferometer as defined in claim 1 wherein said reflecting means further includes a solid body with two angularly adjoining reflecting surfaces respectively confronting said mirrors in parallel relationship therewith.

3. An interferometer as defined in claim 2 wherein said body has two further orthogonally adjoining reflecting surfaces inserted in said second path.

4. An interferometer as defined in claim 3 wherein said second path includes a pair of juxtaposed orthogonally adjoining reflectors respectively confronting said further reflecting surfaces in parallel relationship therewith.

5. An interferometer as defined in claim 4 wherein said supporting means is positioned along a plane bisecting the angles included by said further reflecting surfaces and by said orthogonally adjoining reflectors for allowing said object to be transluminated in one of its halves by rays passing from one of said further reflecting surfaces to the confronting reflector and in the other of its halves by rays passing from the adjoining reflector to the other of said further reflecting surfaces.

6. An interferometer comprising first beam-splitting means positioned to intercept a bundle of incident rays and to direct said rays partly along a first path and partly along a second path; reflecting means in said first path including a solid body with two angularly adjoining reflecting surfaces, a first mirror confronting one of said surfaces for receiving rays therefrom and a second mirror juxtaposed with said first mirror and confronting the other of said surfaces for redirecting said light rays thereto; second beam-splitting means positioned to receive the rays reflected by said other of said surfaces and the rays passing along said second path for combining same into two substantially coincident outgoing bundles; supporting means for an object to be tested in said second path; and adjusting means coupled with at least one of said mirrors for varying their relative position to alter the edgree of coincidence of said outgoing bundles.

7. An interferometer as defined in claim 6 wherein said body has four sides disposed at right angles to one another, one pair of said sides forming said reflecting surfaces, another pair of said sides forming two further reflecting surfaces inserted in said second path.

8. An interferometer as defined in claim 7 wherein said second path includes a pair of juxtaposed orthogonally adjoining reflectors respectively confronting said further reflecting surfaces in parallel relationship therewith, said supporting means being positioned along a plane bisecting the angles included by said further reflecting surfaces and by said orthogonally adjoining reflectors for allowing said object to be transluminated in one of its halves by rays passing from one of said further reflecting surfaces to the confronting reflector and in the other of its halves by rays passing from the adjoining reflector to the other of said further reflecting surfaces.

9. An interferometer comprising first beam-splitting means positioned to intercept a bundle of incident rays and to direct said rays partly along a first path and partly along a second path; reflecting means in said first path including a solid body with two angularly adjoining reflecting surfaces, a first mirror confronting one of said surfaces for receiving rays therefrom and a second mirror juxtaposed with said first mirror and confronting the other of said surfaces for redirecting said rays thereto; second beam-splitting means positioned to receive the rays reflected by said other of said surfaces and the rays passing along said second path for combining same into two substantially coincident outgoing bundles; and supporting means in said first path between said body and said mirrors for concurrently exposing an object to be checked to translumination by rays passing from said one of said surfaces to said first mirror and from said second mirror to said other of said surfaces, said object when mounted on said supporting means having a plane of symmetry bisecting the angles included by said mirrors and by said surfaces.

10. An interferometer as defined in claim 9 wherein said mirrors are formed by internal reflecting surfaces of a prism with an outline generally in the form of a right triangle having its hypotenuse perpendicular to said plane.

11. A method of testing a radiation-transparent article, comprising the steps of splitting a beam of radiation into a first and a second ray bundle, reflecting the first bundle by a pair of juxtaposed, relatively inclined mirrors so that the rays incident on the first mirror and the rays returned by the second mirror pass over parallel paths alongside and next to each other in opposite directions, positioning an object to be tested in line with said rays with a plane of symmetry of said object at the junction of said parallel paths whereby said object is traversed by said incident rays in one of its halves and by said returned rays in the other of its halves, and combining the rays of said first bundle after traversal of said object with the rays of said second bundle to produce a resulting coincidence pattern.

References Cited

UNITED STATES PATENTS

| | | | |
|---|---|---|---|
| 3,393,374 | 7/1968 | Krumboltz | 331—94.5 |
| 2,655,074 | 10/1953 | Eckert et al. | 356—113X |
| 2,660,915 | 12/1953 | Zobel | 356—113X |

FOREIGN PATENTS

| | | | |
|---|---|---|---|
| 858,171 | 1/1961 | Great Britain | 356—113 |
| 444,673 | 12/1924 | Germany | 356—106 |

RONALD L. WIBERT, Primary Examiner

C. CLARK, Assistant Examiner